US010565141B1

United States Patent
Chaiken et al.

(10) Patent No.: US 10,565,141 B1
(45) Date of Patent: Feb. 18, 2020

(54) SYSTEMS AND METHODS FOR HIDING OPERATING SYSTEM KERNEL DATA IN SYSTEM MANAGEMENT MODE MEMORY TO THWART USER MODE SIDE-CHANNEL ATTACKS

(71) Applicant: DELL PRODUCTS L.P., Round Rock, TX (US)

(72) Inventors: Craig L. Chaiken, Pflugerville, TX (US); Michael W. Arms, Pflugerville, TX (US); Ricardo L. Martinez, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/114,744

(22) Filed: Aug. 28, 2018

(51) Int. Cl.
*G06F 13/24* (2006.01)
*G06F 21/74* (2013.01)
*G06F 9/4401* (2018.01)
*G06F 13/16* (2006.01)

(52) U.S. Cl.
CPC ............ *G06F 13/24* (2013.01); *G06F 9/4403* (2013.01); *G06F 13/1673* (2013.01); *G06F 21/74* (2013.01)

(58) Field of Classification Search
CPC .................................. G06F 21/74; G06F 13/24
See application file for complete search history.

(56) References Cited

U.S. PATENT DOCUMENTS

| 5,909,696 | A  | * | 6/1999  | Reinhardt | G06F 12/0802 711/141 |
| 10,108,800 | B1 | * | 10/2018 | Surdu | G06F 21/575 |
| 2004/0158828 | A1 | * | 8/2004 | Zimmer | G06F 9/4401 717/168 |
| 2007/0150632 | A1 | * | 6/2007 | Ayyar | G06F 13/24 710/260 |
| 2018/0322313 | A1 | * | 11/2018 | Yao | G06F 9/45558 |

OTHER PUBLICATIONS

Wikipedia, "Translation Lookaside Buffer", Printed From Internet Jun. 15, 2018, 7 pgs.
Intel, Jiewen Yao, "SMM Protection in EDK II", UEFI Seminar and Plugfest, Mar. 2017, 35 pgs.
(Continued)

*Primary Examiner* — Zachary K Huson
(74) *Attorney, Agent, or Firm* — Egan Peterman Enders Huston (57) ABSTRACT

Systems and methods are provided that may be implemented to hide operating system kernel data in system management mode memory. An information handling system includes a system memory, central processing unit (CPU), and Basic Input Output System (BIOS). The CPU is operable in a system management mode and is programmable to specify an SMM region of the system memory that is only accessible when the CPU is operating in the SMM. The BIOS is programmed to save kernel data from a non-SMM region of the system memory to the SMM region and then clear the kernel data from the non-SMM region in response to an operating system (OS) generating a system management interrupt (SMI) and to restore the kernel data to the non-SMM region of the system memory from the SMM region in response to the OS generating a SMI.

22 Claims, 5 Drawing Sheets

(56) References Cited

OTHER PUBLICATIONS

Intel, "Intel Analysis of Speculative Execution Side Channels", White Paper, Jul. 2018, 16 pgs.
Intel Corporation, Yao et al., "A Tour Beyond Bios Launching Standalone SMM Drivers in the PEI Phase using the EFI Developer Kit II", May 2015, 25 pages.
Intel Corporation, Yao et al., "A Tour Beyond BIOS Supporting an SMM Resource Monitor using the EFI Developer Kit II", Jun. 2015, 29 pages.

* cited by examiner

```
UPDATE ACPI SPECIFICATION TO ADD NEW FEATURE KERNEL_DATA_HIDING AND NEW
SOFTWARE SMI HANDLER DEFINITIONS KERNEL_DATA_SAVE AND KERNEL_DATA_RESTORE
                                    302
```

FIG. 4                                                                                    400

```
                    UEFI FIRMWARE RESET VECTOR INVOKED 402

SYSTEM MANAGEMENT MODE (SMM) DRIVER DISPATCHER UPDATES ACPI TABLE TO:
           1) SET KERNEL_DATA_HIDING FEATURE FLAG TO ENABLED, AND
2) REGISTER KERNEL_DATA_SAVE AND KERNEL_DATA_RESTORE AS HIGHEST PRIORITY
                      SOFTWARE SMI HANDLERS 404

ALLOCATE COMM_BUFFER 406

INSTANTIATE SMI_COMM_BUFFER_STORAGE (IN SMM MEMORY REGION) 408

UPDATE ACPI TABLE WITH COMM_BUFFER ACCESS DETAILS (E.G., ADDRESS, SIZE) 412
```

FIG. 5                                                                                    500

```
DURING BOOT PROCESS (PRIOR TO EXIT BOOT SERVICES), OPERATING SYSTEM (OS)
READS KERNEL_DATA_HIDING DETAILS FROM ACPI TABLE (E.G., COMM_BUFFER ADDRESS,
       KERNEL_DATA_HIDING FEATURE STATUS, KERNEL_DATA_SAVE AND
             KERNEL_DATA_RESTORE INVOCATION INFORMATION) 502
```

FIG. 8

SYSTEMS AND METHODS FOR HIDING OPERATING SYSTEM KERNEL DATA IN SYSTEM MANAGEMENT MODE MEMORY TO THWART USER MODE SIDE-CHANNEL ATTACKS

FIELD

This invention relates generally to information handling systems and, more particularly, to protection against side-channel attacks on computer systems to breach security.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Side-channel security attacks can allow operating system (OS) user mode code to access kernel mode memory that may contain secrets like the contents of cache memories, translation lookaside buffers (TLBs) and encryption keys. One solution is to move the secret data to the system's hard disk drive (HDD) before switching to user mode and restoring from HDD upon return from user mode. However, there are drawbacks to this approach. First, it may cause additional wear on the hard drive and significantly reduce its lifetime, particularly in the case of a solid-state disk (SSD). Second, the solution may cause a significant performance impact due to the large access time associated with reading/writing an HDD/SSD.

SUMMARY

Disclosed herein are systems and methods that may be implemented to hide operating system kernel data in system management mode memory.

In one respect, disclosed herein is an information handling system includes a system memory, central processing unit (CPU), and Basic Input Output System (BIOS). The CPU is operable in a system management mode and is programmable to specify an SMM region of the system memory that is only accessible when the CPU is operating in the SMM. The BIOS is programmed to save kernel data from a non-SMM region of the system memory to the SMM region and then clear the kernel data from the non-SMM region in response to an operating system (OS) generating a system management interrupt (SMI) and to restore the kernel data to the non-SMM region of the system memory from the SMM region in response to the OS generating a SMI.

In another respect, disclosed herein is a non-transitory computer-readable medium (NTCRM) having instructions of an operating system (OS) stored thereon for execution by a CPU to perform operations that include, prior to switching the CPU from a kernel privilege level to a user privilege level, copying kernel data from a kernel data area of a system memory to a buffer, clearing the kernel data from the kernel data area, and invoking a Basic Input Output System (BIOS) to save the kernel data from the buffer to a system management mode (SMM) region of the system memory accessible only when the CPU is operating in SMM and to clear the kernel data from the buffer after saving the kernel data to the SMM region. The operations also include, upon resuming from the user privilege level to the kernel privilege level, invoking the BIOS to restore the kernel data to the buffer from the SMM region and copying the kernel data from the buffer to the kernel data area.

In yet another respect, disclosed herein is a method that includes, while operating a central processing unit (CPU) at a kernel privilege level, invoking an interrupt handler that saves data from a first memory location that resides in a first address space associated with a first operating mode of the CPU to a second memory location that resides in a second address space associated with a second operating mode of the CPU and overwrites the data in the first memory location. The second address space is accessible only when operating the CPU in the second operating mode. The method also includes switching the CPU from operating at the kernel privilege level to a user privilege level, executing code at the user privilege level, switching the CPU back from operating at the user privilege level to operating at the kernel privilege level, and invoking an interrupt handler that restores the data from the second memory location to the first memory location.

Advantageously, the disclosed systems and methods may be implemented in one embodiment to provide a method of hiding secret OS kernel data that is faster than hiding it to HDD/SDD, and that will continue to work when system management security features are fully enabled.

One of the advantages of the kernel data hiding embodiments described herein is that the operating system may detect the support for saving/restoring the secret/protected kernel data to/from the SMM region by reading the Advanced Configuration and Power Interface (ACPI) table. Further, all ACPI-compliant operating systems may use the method. If the BIOS or operating system does not support the method, the operating system will automatically revert to legacy data hiding methods, e.g., save/restore to HDD. Additionally, the use by the software SMIs of an intermediate buffer whose address is ascertainable by both the operating system and BIOS (e.g., the COMM_BUFFER) instead directly accessing the kernel data in system memory assures that the embodiments are compatible with anticipated SMI security changes, e.g., within Microsoft Windows operating systems, such as restrictions upon memory locations accessible by an SMI handler. Latency may be optimized for the calls to the SMI handlers that save/restore the kernel data to/from the COMM_BUFFER, which may be called with a very high frequency, by inserting the SMI handlers at the highest priority above other SMI handlers. Still further, hiding kernel data in SMM memory protects the kernel data from side-channel attacks, reduces kernel/user mode transition latency (over other solutions, e.g., save/ restore to HDD), and may help avoid HDD wear out, particularly in the case of solid state disk (SSD) drives. Another drawback of the HDD-based method is that if power is lost after the kernel data is saved to HDD and the power is subsequently lost, the possibility exists that the kernel data could be found by an attacker; whereas, advantageously the SMM region to which the kernel data is saved according to embodiments described herein is a volatile memory, which means the kernel data will be cleared by the loss of power. Finally, the physical address of the COMM_BUFFER is reported in the ACPI table, which is a standard supported in the major operating systems.

DESCRIPTION OF ILLUSTRATIVE EMBODIMENTS

Figure 1:
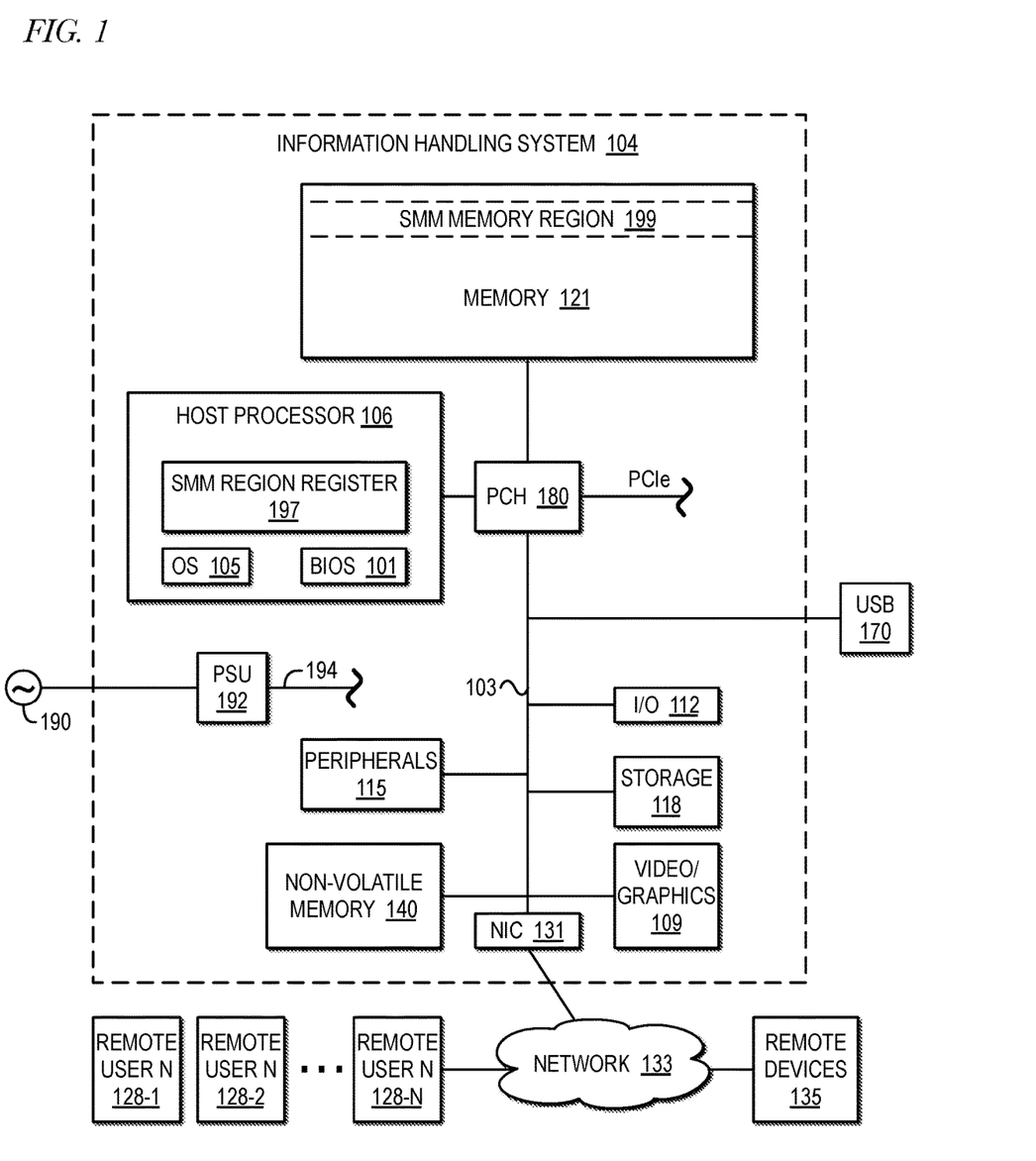
FIG. 1 is a block diagram of an information handling system according to one exemplary embodiment of the disclosed systems and methods.

FIG. 1 is a block diagram of an information handling system 104 (e.g., such as a server, desktop computer, laptop, etc.) as it may be configured according to one exemplary embodiment to perform kernel data hiding using SMM memory. As shown, system 104 may include one or more host processing device/s 106 (e.g., AMD or Intel-based CPU such as Itanium or any other type of suitable host processing device), one or more buses or communication media 103 (e.g., PCIe bus, USB, SMBus, SATA, other appropriate data buses such as memory bus, etc.), video/graphics hardware 109 (e.g., video adapter or graphics processor unit), storage 118 (e.g., solid state drive (SSD), hard disk drive and/or optical drive, etc.), system memory 121 (e.g., DRAM), local input/output (I/O) 112, peripherals 115 (e.g., keyboard, mouse, etc.), non-volatile memory 140, and remote access controller (RAC) (not shown). Examples of a remote access controller include an integrated Dell Remote Access Controller (iDRAC) available from Dell Technologies Inc. of Round Rock, Tex., etc.). In the exemplary embodiment of FIG. 1, host processing device/s 106 is configured to load and run a Basic Input Output System (BIOS) 101 (e.g., UEFI firmware) and host OS 105 (e.g., Windows-based OS, Linux-based OS, etc.), among others. The video/graphics hardware 109 controls a video display (not shown).

Bus/es 103 provides a mechanism for the various components of system 104 to communicate and couple with one another. As shown, host processing device 106 may be coupled in an embodiment to bus/es 103 via an embedded platform controller hub (PCH) 180 and may be coupled to facilitate input/output functions for the processing device/s 106 with various internal system components of information handling system 104 through bus/es 103 such as PCI, PCIe, SPI, USB, low pin count (LPC), etc. Examples of such system components include, but are not limited to, NVRAM, BIOS SPI Flash, NVDIMMS, DIMMS, PCIe Devices, etc. The PCH 180 is directly coupled to system memory 121 as shown.

In one embodiment, host processing device/s 106 may be an in-band processing device configured to run a host operating system (OS) 105. Besides memory 121 (e.g., random access memory "RAM"), processor 106 may include cache memory for storage of frequently accessed data. Information handling system 104 may also include a network access card (NIC) 131 that is communicatively coupled to network 133 (e.g., Internet or corporate intranet) as shown to allow various components of system 104 to communicate with external and/or remote device/s 135 across network 133. Other external devices, such as an external universal serial bus (USB) device 170 may be coupled to processing device/s 106 via bus/es 103. In this embodiment, information handling system 104 also includes power supply unit (PSU) 192 that is coupled to receive power from AC mains 190 and to perform appropriate power conversion and voltage regulation to produce regulated internal power 194 for use by other power-consuming components of system 104. System 104 may also include a baseboard management controller (BMC) (not shown). As shown, in the embodiment of FIG. 1 the host system 104 may provide access to a plurality of remote users 128-1 through 128-N, although access may be provided to a single user 128 in other embodiments. In this regard, remote users may manage, administer, use, and/or access various resources of host system 104 (e.g., either native or virtual) from a remote location, e.g., via network 133 and/or other suitable communication medium or media.

The host processing device 106 is capable of executing instructions at a plurality of different privilege levels. In one embodiment, the processing device 106 is capable of executing instructions at least at a kernel privilege level (commonly referred to as ring 0, or kernel mode) and at a user privilege level (commonly referred to as user level, or user mode), which are well-known in the art of x86 instruction set architecture (ISA) processors, for example. The host processing device 106 is also capable of operating in a plurality of modes, e.g., real mode, protected mode, virtual 8086 mode, long mode, and system management mode (SMM), which are well-known in the art of x86 instruction set architecture (ISA) processors, for example. In particular, the host processing device 106 includes a register 197 that may be programmed to specify a region 199 of system memory 121 that may only be accessed when the processing device 106 is operating in SMM. In one embodiment, if an instruction attempts to read the SMM memory region 199 (also referred to as SMRAM) when the processing device 106 is not operating in SMM then the processing device 106 returns a zero value, and if an instruction attempts to read the SMM memory region 199 when the processing device 106 is not operating in SMM then the processing device 106 throws away the data, i.e., does not update system memory 121. In this sense, the SMM memory region 199 may be viewed as a separate address space from the address space accessible when the processing device 106 is operating in a non-SMM.

The SMM may be entered via a system management interrupt (SMI). The system firmware (e.g., BIOS 101) may include SMI handlers that are invoked in response to an SMI. In one embodiment, the SMM code is stored in non-volatile memory 140 and may be copied to the SMM memory region 199 at boot time. An SMI may be generated via a hardware interrupt event independent of code execution, e.g., by assertion of an interrupt pin (e.g., the SMI #) into the processing device 106. In one embodiment, an SMI may also be invoked by software via execution of an instruction, e.g., an instruction that writes an I/O port (e.g., which a special value) that is recognized by the system as making a request to trigger an SMI. In one embodiment, the operating system (OS) 105 may execute the instruction to invoke a software SMI, which invokes a SMI handler (e.g., KERNEL_DATA_SAVE or KERNEL_DATA_RESTORE described with respect to FIGS. 6 and 7). As described herein, advantageously the system BIOS 101 and OS 105 may be enhanced to provide support for saving kernel data in the SMM memory region 199 and then clearing kernel data from the non-SMM memory portion of the system memory 121 before switching to user privilege level—in order to hide/protect the kernel data from user mode side-channel attacks—and then to restore the kernel data from the SMM region 199 to its original location in system memory 121 upon resuming from user privilege level back to kernel privilege level, as described in more detail below. Further advantageously, the OS 105 may be enhanced to recognize the presence of the kernel data save/restore feature enhancement to the BIOS 101 and to employ the feature to protect kernel data in a manner that may be significantly higher performing than a kernel data hiding technique that saves/restores kernel data to/from HDD, for example. In one embodiment, support for the kernel data protection enhancements in the BIOS 101 may be detected by the OS 105 via an ACPI table of the system, which may also be employed by the BIOS 101 to provide to the OS 105 an address of an intermediate buffer shared by the BIOS 101 and OS 105 for passing the kernel data during the save/restore operations and which may be employed by the BIOS 101 to inform the OS 105 how to invoke the KERNEL_DATA_SAVE or KERNEL_DATA_RESTORE SMI handlers, as described in more detail below.

It will be understood that the embodiment of FIG. 1 is exemplary only, and that an information handling system may be provided with one or more processing devices that may perform the functions of host processing device/s 106, etc. Examples of such processing devices include, but are not limited to, central processing units (CPUs), embedded controllers, microcontrollers, application specific integrated circuits (ASICs), field programmable gate arrays (FPGAs), etc. It will also be understood that the particular configuration of FIG. 1 is exemplary only, and that other information handling system architectures may be employed in the practice of the disclosed systems and methods.

Figure 2:
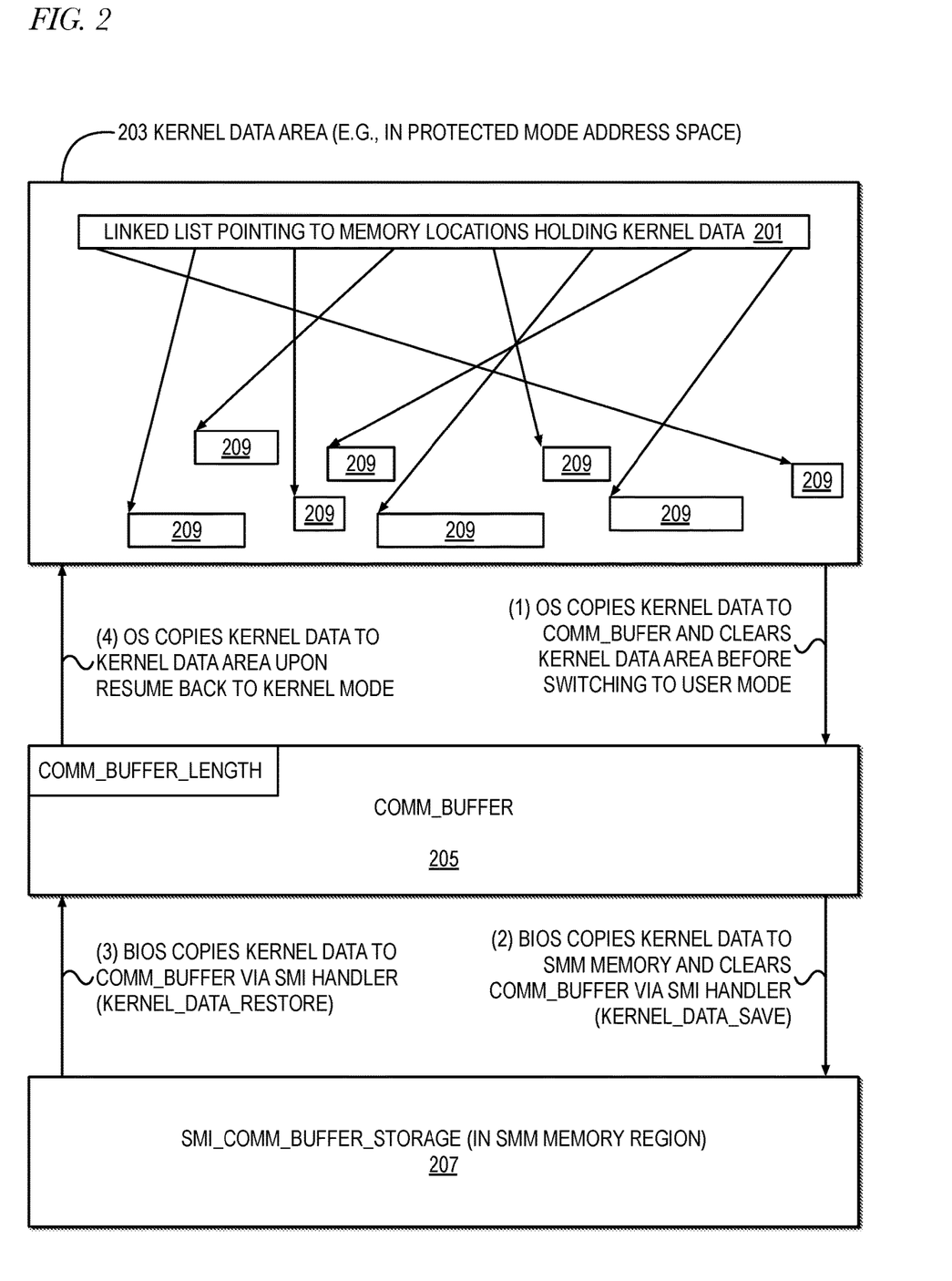
FIG. 2 is a diagram illustrating aspects of a system that hides protected/secret OS kernel data in SMM memory to prevent user mode side-channel attacks according to one exemplary embodiment of the disclosed systems and methods.

FIG. 2 is a diagram illustrating aspects of a system 200 that hides protected/secret OS kernel data in SMM memory (e.g., SMM region 199 of FIG. 1) to prevent user mode side-channel attacks is shown. The system includes a kernel data area 203, a COMM_BUFFER 205, and a SMI_COMM_BUFFER STORAGE 207. The SMI_COMM_BUFFER STORAGE 207 is a memory buffer that resides in the region of system memory that is only accessible when the CPU is operating in SMM. The COMM_BUFFER 205 resides in a region of system memory that is accessible both when the CPU is operating in SMM and when the system is operating in modes other than SMM, such as protected mode or real mode. In one embodiment, the COMM_BUFFER 205 has a page table entry that may be employed to enable the operating system to access it while running in protected mode, and the location of the COMM_BUFFER 205 is also defined in a memory range register that enables the BIOS to access it while running in SMM. Alternatively, the BIOS accesses the COMM_BUFFER 205 using a real mode address. The system 200 includes a plurality of kernel data 209 in a kernel data area 203 of system memory. The kernel data 209 may include secrets, such as translation-lookaside buffer (TLB) contents or encryption keys, that need to be protected from user mode side-channel attacks. The plurality of kernel data 209 are pointed to by a linked list 201 that specifies the virtual memory address and length/size of each of the kernel data 209. Other embodiments of data structures may be employed to specify the location and size of the kernel data 209 other than a linked list. In one embodiment, the kernel data area 203 resides in the portion of system memory that is not in the SMM memory region, such as in a protected mode address space or a real mode address space. In one embodiment, the first word (e.g., 4 bytes) of the COMM_BUFFER 205 is used to hold the total length of the kernel data 209 copied to/from the COMM_BUFFER 205.

As shown, a sequence of events is performed by the OS/BIOS to protect the kernel data 209 from user mode side-channel attacks. First, the OS copies the kernel data 209 from the kernel data area 203, using the linked list 201, to the COMM_BUFFER 205 and clears (e.g., zeroes out) the kernel data 209 from the kernel data area 203 while operating at kernel privilege level (also referred to as kernel mode) before switching to user privilege level (also referred to as user mode). In one embodiment, the OS also updates the COMM_BUFFER LENGTH with the total length of the kernel data 209 copied to the COMM_BUFFER 205. Second, the OS invokes an SMI handler of the BIOS (KERNEL_DATA_SAVE) to copy the kernel data 209 from the COMM_BUFFER 205 to the SMI COMM_BUFFER STORAGE 207 and clear the kernel data from the COMM_BUFFER 205 while running in SMM. The OS then switches to user mode to execute code from which the kernel data 209 needs protection from side-channel attacks. Third, after resuming from user mode back to kernel mode, the OS invokes an SMI handler (KERNEL_DATA_RESTORE) to copy the kernel data from the SMI_COMM_BUFFER STORAGE 207 to the COMM_BUFFER 205. In one embodiment, the OS uses the COMM_BUFFER LENGTH to determine the total length of the kernel data 209 needed to be copied to the COMM_BUFFER 205. Fourth, the OS copies the kernel data from the COMM_BUFFER 205 to the kernel data area 203 using the linked list 201. The constituent operations of FIG. 2 are described in more detail below with respect to the remaining Figures.

Figure 3:
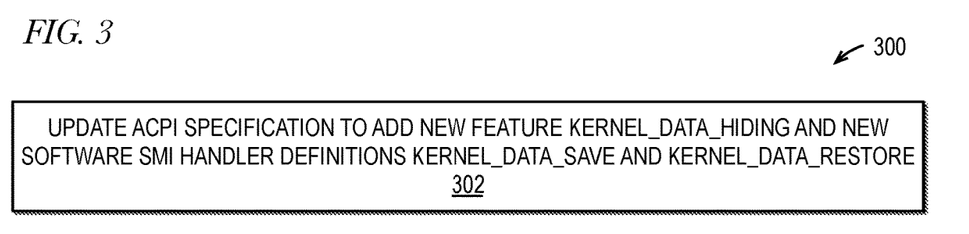
FIG. 3 is a flow diagram illustrating the addition of aspects of the kernel data hiding feature to the ACPI specification according to one exemplary embodiment of the disclosed systems and methods.

FIG. 3 is a flow diagram 300 illustrating the addition of aspects of the kernel data hiding feature to the ACPI specification is shown. More specifically, at block 302, the ACPI specification is updated to specify the location within the ACPI table of a flag, KERNEL_DATA_HIDING, that indicates whether or not the feature is supported by the BIOS. In one embodiment, the location within the ACPI table is a location that was previously reserved or unused, e.g., that would be set to zero prior to the presence of the feature. In one embodiment, a unique code is associated with the support of the feature, and the ACPI specification is updated to specify the unique code. Additionally, the ACPI specification is updated to specify the location within the ACPI table of the address of the COMM_BUFFER 205. Furthermore, the ACPI specification is updated to define the KERNEL_DATA_SAVE and KERNEL_DATA_RESTORE SMI handlers.

Figure 4:
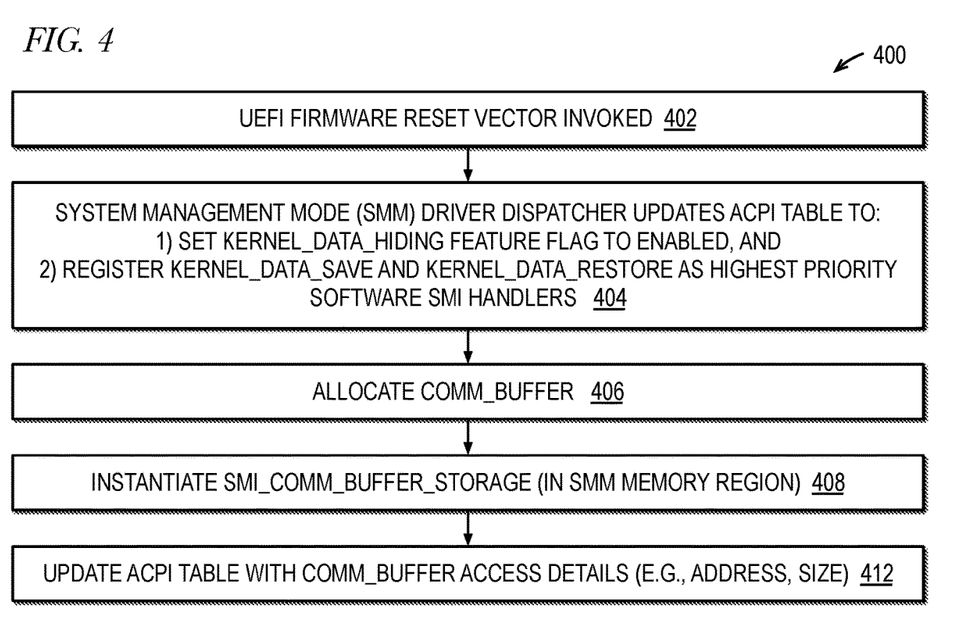
FIG. 4 is a flow diagram illustrating operation of BIOS to support the kernel data hiding feature according to one exemplary embodiment of the disclosed systems and methods.

FIG. 4 is a flow diagram 400 illustrating operation of the BIOS to support the kernel data hiding feature. Flow begins at block 402.

At block 402, the Unified Extensible Firmware Interface (UEFI) firmware reset vector is invoked. Flow proceeds to block 404.

At block 404, a SMM driver dispatcher updates the ACPI table to set the KERNEL_DATA_HIDING feature flag to an enabled state and to register the KERNEL_DATA_SAVE and KERNEL_DATA_RESTORE has the highest priority SMI handlers, e.g., ahead of all other SMI handlers in the system. This is particularly advantageous since switches from kernel mode to user mode and back may occur relatively frequently. Flow proceeds to block 406.

At block 406, the BIOS allocates the COMM_BUFFER 205. In one embodiment, the BIOS allocates the COMM_BUFFER 205 as an EfiRuntimeServicesData type buffer. The BIOS also populates the memory range register with the address of the COMM_BUFFER to enable the KERNEL_DATA_SAVE and KERNEL_DATA_RESTORE SMI handlers to access it in SMM. Flow proceeds to block 408.

At block 408, the BIOS instantiates the SMI_COMM_BUFFER STORAGE 207 in the SMM region 199. Flow proceeds to block 412.

At block 412, the BIOS updates the ACPI table with the access details of the COMM_BUFFER 205, e.g., its address and size. Flow ends at block 412.

Figure 5:
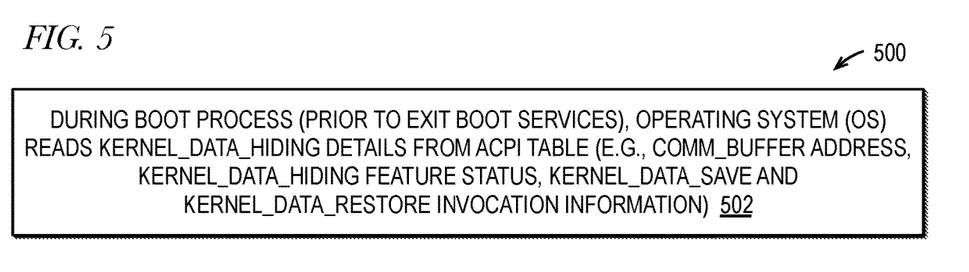
FIG. 5 is a flow diagram illustrating operation of the OS to utilize the kernel data hiding feature according to one exemplary embodiment of the disclosed systems and methods.

FIG. 5 is a flow diagram 500 illustrating operation of the OS to utilize the kernel data hiding feature. At block 502, during system boot process (e.g., prior to Exit Boot Services), the OS reads the KERNEL_DATA_HIDING details from the ACPI table, such as the COMM_BUFFER 205 address, the KERNEL_DATA_HIDING flag, and information about the KERNEL_DATA_SAVE and KERNEL_DATA_RESTORE SMI handlers. These values are used subsequently by the OS, as described in more detail below.

Figure 6:
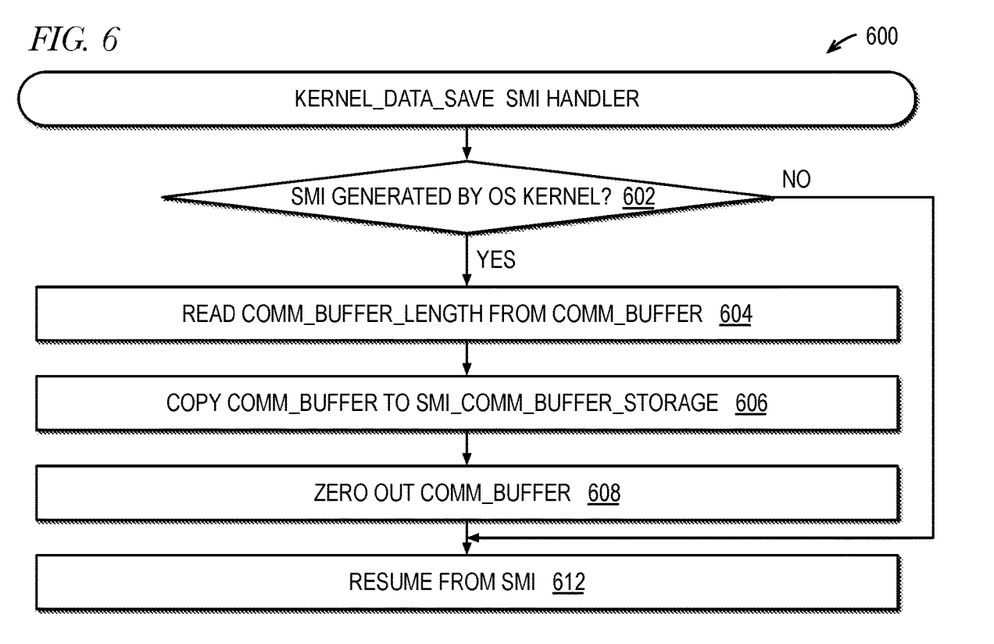
FIGS. 6 and 7 are flow diagrams illustrating operation of the BIOS to perform the kernel data hiding feature according to one exemplary embodiment of the disclosed systems and methods.

FIG. 6 is a flow diagram 600 illustrating operation of the BIOS to perform the kernel data hiding feature. More specifically, the flow diagram 600 describes the KERNEL_DATA_SAVE SMI handler. Flow begins at block 602.

At block 602, the KERNEL_DATA_SAVE handler makes a determination whether the code that invoked the SMI to call the KERNEL_DATA_SAVE handler was executing at kernel privilege level. As the CPU switches to SMM, it saves to the SMM region 199 the current CPU state, which includes the current privilege level. In one embodiment, the KERNEL_DATA_SAVE handler makes the determination by examining the privilege level indicated in the saved CPU state. If the code that invoked the KERNEL_DATA_SAVE handler was executing at kernel privilege level, flow proceeds to block 604; otherwise, flow proceeds to block 612 where the KERNEL_DATA_SAVE handler resumes from the SMI.

Figure 8:
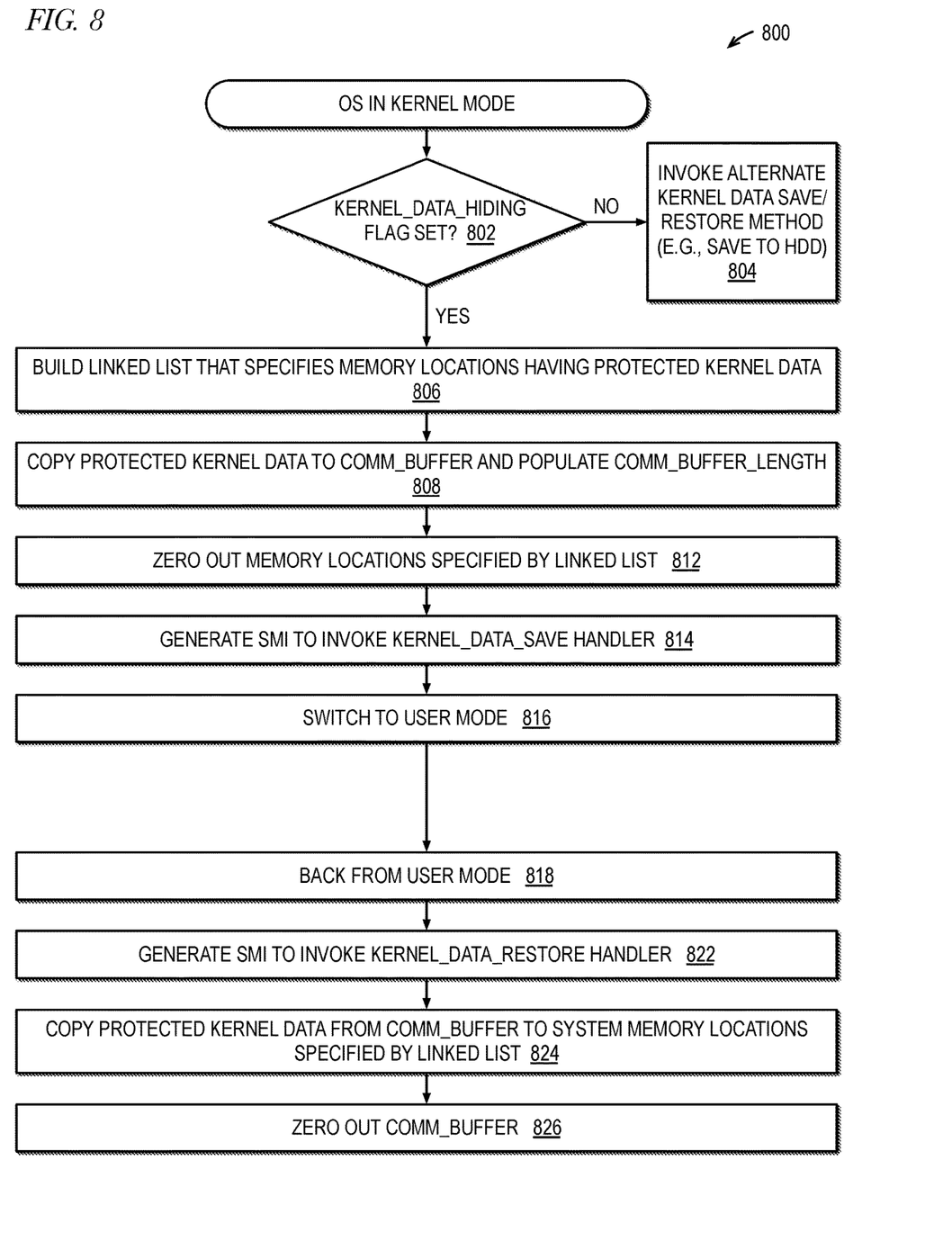
FIG. 8 is a flow diagram illustrating operation of the OS to perform the kernel data hiding feature according to one exemplary embodiment of the disclosed systems and methods.

At block 604, the KERNEL_DATA_SAVE handler reads the COMM_BUFFER LENGTH from the COMM_BUFFER 205 (which was previously populated by the OS, e.g., at block 808 of FIG. 8). Flow proceeds to block 606.

At block 606, the KERNEL_DATA_SAVE handler copies the kernel data from the COMM_BUFFER 205 to the SMI_COMM_BUFFER STORAGE 207 based on the COMM_BUFFER LENGTH. Flow proceeds to block 608.

At block 608, the KERNEL_DATA_SAVE handler clears (e.g., zeroes out) the kernel data from the COMM_BUFFER 205. Flow proceeds to block 412.

At block 612, the KERNEL_DATA_SAVE handler resumes from the SMI. Flow ends at block 612.

Figure 7:
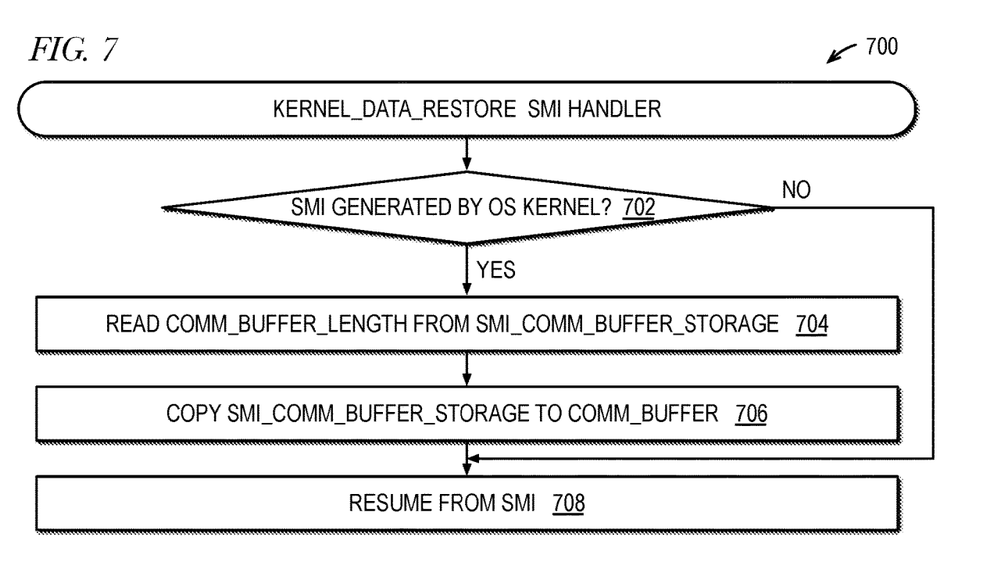

FIG. 7 is a flow diagram 700 illustrating operation of the BIOS to perform the kernel data hiding feature. More specifically, the flow diagram 700 describes the KERNEL_DATA_RESTORE SMI handler. Flow begins at block 702.

At block 702, the KERNEL_DATA_RESTORE handler makes a determination whether the code that invoked the SMI to call the KERNEL_DATA_RESTORE handler was executing at kernel privilege level. If so, flow proceeds to block 704; otherwise, flow proceeds to block 708 where the KERNEL_DATA_RESTORE handler resumes from the SMI.

At block 704, the KERNEL_DATA_RESTORE handler reads the COMM_BUFFER_LENGTH from the COMM_BUFFER 205. Flow proceeds to block 706.

At block 706, the KERNEL_DATA_RESTORE handler copies the kernel data from the SMI_COMM_BUFFER STORAGE 207 to the COMM_BUFFER 205 based on the COMM_BUFFER_LENGTH. Flow proceeds to block 708.

At block 708, the KERNEL_DATA_RESTORE handler resumes from the SMI. Flow ends at block 708.

FIG. 8 is a flow diagram 800 illustrating operation of the OS to perform the kernel data hiding feature. More specifically, the flow diagram 800 illustrates operation of the OS to make a switch to execute code at user privilege level, which might pose a threat of a side-channel attack, but which the OS attempts to prevent by hiding kernel data in the SMM memory region. Initially, the OS is operating at kernel privilege level. Flow begins at block 802.

At block 802, OS determines whether the KERNEL_DATA_HIDING feature is enabled, e.g., by examining the KERNEL_DATA_HIDING flag in the ACPI table. If the KERNEL_DATA_HIDING feature is enabled, flow proceeds to block 806; otherwise, flow proceeds to block 804.

At block 804, the OS invokes an alternate method of hiding the kernel data 209, e.g., by saving/restoring it to/from hard disk drive (HDD), which is a much slower way of protecting the kernel data 209. Flow ends at block 804.

At block 806, the OS builds a linked list (e.g., 201 of FIG. 2) that specifies the memory locations of the kernel data 209. The linked list specifies the virtual memory address and length of each chunk of the kernel data 209. Flow proceeds to block 808.

At block 808, the OS copies the kernel data 209 from the kernel data area 203 to the COMM_BUFFER 205 and populates the COMM_BUFFER_LENGTH with the total length of the kernel data 209 it copied to the COMM_BUFFER 205. Flow proceeds to block 812.

At block 812, the OS clears out the memory locations in the kernel data area 203 specified by the linked list 201, i.e., the OS overwrites the kernel data 209 in the kernel data area 203. Flow proceeds to block 814.

At block 814, the OS generates an SMI to invoke the KERNEL_DATA_SAVE handler. Flow proceeds to block 816.

at 816, the OS switches to user mode in order to execute code in user mode (i.e., at user privilege level), which would pose a threat of a side-channel attack, but which the KERNEL_DATA_HIDING feature operates to thwart. Flow proceeds to block 818.

At block 818, the OS resumes back from user mode to kernel mode (i.e., to executing at user privilege level). Flow proceeds to block 822.

At block 822, the OS generates an SMI to invoke the KERNEL_DATA_RESTORE handler. Flow proceeds to block 824.

At block 824, the OS copies the kernel data from the COMM_BUFFER 205 to the system memory locations in the kernel data area 203 specified by the linked list 201. Flow proceeds to block 826.

At block 826, the OS clears out the COMM_BUFFER 205. Flow ends at block 826.

It will be understood that the steps of FIGS. 3 through 8 are exemplary only, and that any combination of fewer, additional and/or alternative steps may be employed that are suitable for hiding kernel data in SMM memory while running at user privilege level.

It will be understood that one or more of the tasks, functions, or methodologies described herein (e.g., including those described herein for components 106, etc.) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program comprising instructions is configured when executed on a processing device in the form of a programmable integrated circuit (e.g., processor such as CPU, controller, microcontroller, microprocessor, ASIC, etc. or programmable logic device "PLD" such as FPGA, complex programmable logic device "CPLD", etc.) to perform one or more steps of the methodologies disclosed herein. In one embodiment, a group of such processing devices may be selected from the group consisting of CPU, controller, microcontroller, microprocessor, FPGA, CPLD and ASIC. The computer program of instructions may include an ordered listing of executable instructions for implementing logical functions in an information handling system or component thereof. The executable instructions may include a plurality of code segments operable to instruct components of an information handling system to perform the methodologies disclosed herein.

It will also be understood that one or more steps of the present methodologies may be employed in one or more code segments of the computer program. For example, a code segment executed by the information handling system may include one or more steps of the disclosed methodologies. It will be understood that a processing device may be configured to execute or otherwise be programmed with software, firmware, logic, and/or other program instructions stored in one or more non-transitory tangible computer-readable mediums (e.g., data storage devices, flash memories, random update memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed methods and systems may be utilized in various combinations and/or independently. Thus, the invention is not limited to only those combinations shown herein, but rather may include other combinations.

What is claimed is:

1. An information handling system, comprising:
   a system memory;
   a central processing unit (CPU) operable in a system management mode (SMM), wherein the CPU is programmable to specify an SMM region of the system memory that is only accessible when the CPU is operating in the SMM; and
   a Basic Input Output System (BIOS) programmed to:
   save kernel data from a non-SMM region of the system memory to the SMM region and then clear the kernel data from the non-SMM region to hide the kernel data within the SMM region from a user mode code only in response to an operating system (OS) generating a first system management interrupt (SMI) at a kernel privilege level before switching the CPU from a kernel privilege level to a user privilege level; and
   then restore the kernel data to the non-SMM region of the system memory from the SMM region only in response to the OS generating a second SMI after switching the CPU from the user privilege level back to the kernel privilege level.

2. The information handling system of claim 1,
   wherein the non-SMM region comprises a buffer into which the OS previously copies the kernel data from a kernel data area of the system memory, the OS also previously clearing the kernel data from the kernel data area after copying the kernel data into the buffer.

3. The information handling system of claim 2,
   wherein the BIOS is further programmed to:
   report the address of the buffer to the OS via the ACPI table.

4. The information handling system of claim 3,
   wherein the BIOS is further programmed to:
   allocate the buffer of type EfiRuntimeServicesData prior to reporting the address of the buffer to the OS via the ACPI table.

5. The information handling system of claim 1,
wherein the BIOS is further programmed to:
   refrain from performing the save/restore of the kernel data to/from the SMM region if the SMI was not generated at a kernel privilege level.

6. The information handling system of claim 5,
wherein the BIOS is further programmed to:
   determine whether the SMI was generated at a kernel privilege level by examining a SMI saved CPU state from the SMM region.

7. The information handling system of claim 1,
wherein the BIOS is further programmed to:
   set a flag in an Advanced Configuration and Power Interface (ACPI) table of the system to indicate an ability of the BIOS to perform the save/restore of the kernel data to/from the SMM region.

8. The information handling system of claim 1,
wherein the BIOS is further programmed to:
   insert one or more SMI handlers to perform the save/restore of the kernel data to/from the SMM region ahead of all other SMI handlers in the system.

9. The information handling system of claim 8,
wherein the BIOS is further programmed to:
   update an Advanced Configuration and Power Interface (ACPI) table of the system to identify the one or more SMI handlers.

10. A non-transitory computer-readable medium (NTCRM) having instructions of an operating system (OS) stored thereon for execution by a CPU to perform operations comprising:
   only prior to switching the CPU from a kernel privilege level to a user privilege level:
      copying kernel data from a kernel data area of a system memory to a buffer;
      clearing the kernel data from the kernel data area; and
      invoking a Basic Input Output System (BIOS) to save the kernel data from the buffer to a system management mode (SMM) region of the system memory accessible only when the CPU is operating in SMM and to clear the kernel data from the buffer after saving the kernel data to the SMM region to hide the kernel data within the SMM region from a user mode code; and
   only upon resuming from the user privilege level to the kernel privilege level:
      invoking the BIOS to restore the kernel data to the buffer from the SMM region; and
      copying the kernel data from the buffer to the kernel data area.

11. The NTCRM of claim 10, having instructions of the operating system (OS) stored thereon for execution by the CPU to perform further operations comprising:
   obtaining an address of the buffer from an Advanced Configuration and Power Interface (ACPI) table of the system.

12. The NTCRM of claim 10, having instructions of the operating system (OS) stored thereon for execution by the CPU to perform further operations comprising:
   examine a flag in an Advanced Configuration and Power Interface (ACPI) table of the system to determine whether the BIOS includes the ability to save/restore the kernel data to/from the SMM region; and
   refraining from said invoking the BIOS to save/restore the kernel data if the BIOS does not include the ability to save/restore the kernel data.

13. The NTCRM of claim 10, having instructions of the operating system (OS) stored thereon for execution by the CPU to perform further operations comprising:
   invoking an alternate method of saving/restoring the kernel data if the BIOS does not include the ability to save/restore the kernel data.

14. The NTCRM of claim 10, having instructions of the operating system (OS) stored thereon for execution by the CPU to perform further operations comprising:
   clearing the kernel data from the buffer after said copying the kernel data from the buffer to the kernel data area.

15. The NTCRM of claim 10,
wherein said invoking the BIOS to save/restore the kernel data comprises generating a system management interrupt (SMI).

16. A method, comprising:
   only while operating a central processing unit (CPU) at a kernel privilege level, invoking an interrupt handler that saves data from a first memory location that resides in a first address space associated with a first operating mode of the CPU to a second memory location that resides in a second address space associated with a second operating mode of the CPU and overwrites the data in the first memory location to hide the data within the second address space from a user mode code;
   wherein the second address space is accessible only when operating the CPU in the second operating mode;
   then switching the CPU from operating at the kernel privilege level to a user privilege level;
   then executing code at the user privilege level;
   then switching the CPU back from operating at the user privilege level to operating at the kernel privilege level; and
   then only after switching the CPU back to operating at the kernel privilege level, invoking an interrupt handler that restores the data from the second memory location to the first memory location.

17. The method of claim 16, further comprising:
   copying, by an operating system (OS) at the kernel privilege level, the data from a kernel data area to the first memory location and overwriting the data in the kernel data area prior to said invoking an interrupt handler that saves data from a first memory location;
   copying, by the OS at the kernel privilege level, the data to the kernel data area from the first memory location after said invoking an interrupt handler that restores the data from a first memory location; and
   wherein the first memory location is allocated by a Basic Input Output System (BIOS) that provides an address of the first memory location to the OS via an Advanced Configuration and Power Interface (ACPI) table.

18. The method of claim 16,
wherein the second operating mode is a system management mode (SMM) of the CPU; and
wherein said interrupt handlers comprise system management interrupt (SMI) handlers.

19. The method of claim 16,
refraining, by the interrupt handler, from saving/restoring the data if the interrupt handler is not invoked at the kernel privilege level.

20. The method of claim 16, further comprising:
   setting, by a Basic Input Output System (BIOS) at system boot time, a flag in an Advanced Configuration and Power Interface (ACPI) table to indicate the BIOS supports invocation of the interrupt handlers that save/restore the data; and determining, by an operating system via the ACPI table flag, whether the BIOS supports invocation of the interrupt handlers that save/restore the data.

21. The method of claim 16, further comprising overwriting the data in the first memory location to prevent a user mode side-channel attack by hiding the data within the second address space from the user mode code.

22. The information handling system of claim 1, where the BIOS is programmed to clear the kernel data from the non-SMM region to prevent a user mode side-channel attack by hiding the kernel data within the SMM region from the user mode code.

* * * * *